(12) United States Patent
Striebel (10) Patent No.: US 11,708,120 B1
(45) Date of Patent: Jul. 25, 2023

(54) PORTABLE TRANSFORMABLE BICYCLE SUPPORT RACK

(71) Applicant: Jeffery Striebel, Midland, MI (US)

(72) Inventor: Jeffery Striebel, Midland, MI (US)

(*) Notice: Subject to any disclaimer, the term of this patent is extended or adjusted under 35 U.S.C. 154(b) by 0 days.

(21) Appl. No.: 17/660,918

(22) Filed: Apr. 27, 2022

(51) Int. Cl.
    *B62H 3/08* (2006.01)
    *B62H 3/12* (2006.01)

(52) U.S. Cl.
    CPC ............ *B62H 3/08* (2013.01); *B62H 3/12* (2013.01)

(58) Field of Classification Search
    CPC .......... B62H 3/08; B62H 3/12; B25H 1/0014; B60R 9/06; B60R 9/10
    See application file for complete search history.

(56) References Cited

U.S. PATENT DOCUMENTS

| | | | |
|---|---|---|---|
| 4,465,196 A | 8/1984 | Erb | |
| 4,830,196 A | 5/1989 | Csanady | |
| 4,997,116 A * | 3/1991 | Grim | B60R 9/06 224/532 |
| 5,246,120 A | 9/1993 | Walker | |
| 5,645,202 A * | 7/1997 | Kaloustian | B60R 9/06 224/532 |
| 5,702,007 A | 12/1997 | Fritz et al. | |
| 6,186,727 B1 * | 2/2001 | Hamilton | B60P 3/125 414/427 |
| 7,104,430 B2 | 9/2006 | Reeves | |
| 7,810,685 B2 * | 10/2010 | Bove | B60R 9/10 248/62 |
| 9,358,933 B2 * | 6/2016 | Phillips | B60R 9/10 |
| 9,981,706 B2 | 5/2018 | Van Straaten | |
| 10,723,278 B2 * | 7/2020 | Bowles | B60R 9/06 |
| 2002/0117524 A1 * | 8/2002 | Jeong | B60R 9/06 224/532 |
| 2003/0089896 A1 * | 5/2003 | Reinikka | B66F 3/36 254/134 |
| 2013/0062384 A1 * | 3/2013 | Phillips | B60R 9/10 224/500 |
| 2014/0125045 A1 * | 5/2014 | Nusbaum | B60R 9/10 280/769 |
| 2014/0239027 A1 * | 8/2014 | Dickinson | B60R 9/06 224/534 |
| 2015/0210223 A1 * | 7/2015 | Nusbaum | B60R 9/10 224/533 |
| 2016/0001710 A1 * | 1/2016 | Prescott | B60R 9/06 224/536 |
| 2016/0355140 A1 * | 12/2016 | Condon | B60R 9/06 |

FOREIGN PATENT DOCUMENTS

| | | | | |
|---|---|---|---|---|
| CN | 204452246 U | * | 7/2015 | |
| EP | 3508384 A1 | * | 7/2019 | B60R 9/06 |

* cited by examiner

*Primary Examiner* — Ko H Chan (57) ABSTRACT

A portable, foldable, transformable bicycle support rack having stability, ease of use, transferability, portability, space saving, versatility of use.

15 Claims, 8 Drawing Sheets

PORTABLE TRANSFORMABLE BICYCLE SUPPORT RACK

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

What is disclosed herein is a portable, transformable bicycle support rack. Household garages are usually the designated storage space for bicycles. Whether one has few or many bicycles, this storage creates major problems for the householder because bicycles are ordinarily stored standing in an upright position or strewn upon the floor and thus take up valuable floor space, sometimes to the extent that cars are not able to be parked in the garage. Bicycles also travel with owners on vacations, to trails and various events, and need support racks to transport them.

Various bike storage racks are available such as straps, hooks, wheel support racks and the like.

Once such storage rack is disclosed in U.S. Pat. No. 4,465,196 that issued Aug. 14, 1984, to Erb in which a three-point support for a bicycle comprised of outwardly diverging, and inwardly converging tire-wedging members are used to support bikes.

U.S. Pat. No. 4,830,196 that issued on May 16, 1989, to Csanady deals with a bicycle support rack that includes an upper bracket secured to a wall, or some other upright, for supporting the front wheel of a bicycle.

U.S. Pat. No. 5,246,120 that issued Sep. 21, 1993, to Walker deals with a bicycle rack that is essentially an L-shaped bicycle rack in which the horizontal member folds down and then can be returned to a vertical position.

A rack especially adapted for use with bicycle storage can be found in U.S. Pat. No. 5,702,007, that issued Dec. 30, 1997, to Fritz, et al. This device is similar to the Walker device, but the overall structure is enhanced.

U.S. Pat. No. 7,104,430 that issued Sep. 12, 2006, to Reeves deals with a bicycle rack for use on a flat surface, such as a garage floor. It consists of wheel-receiving wells for receiving the front wheel of a bicycle and has contact with at least two points. There is a wheel-engaging arm that pivots that helps hold the wheel in place.

U.S. Pat. No. 9,981,706 that issued May 29, 2018, to Van Straaten deals with a bicycle stand that is a free-standing device that is useful on a garage floor. The device is adjustable to accommodate various sized wheels.

BRIEF SUMMARY OF THE INVENTION

Thus, what is disclosed herein is a portable, transformable bicycle support rack. The portable transformable bicycle support rack consists of two hollow, tubular support rods, wherein a distal end of each support rod is fixed parallel to each other in a bottom common bracket and at a predetermined distance apart. The bottom common bracket has a first slotted opening to accommodate a first flexible supporting strap to a back of the bottom common bracket.

A near end of each support rod is fixed to a top common metal cradle wherein a forward edge of the common metal cradle has a notch and separated first openings formed in it. The near end of each support rod extends through respective second openings in the common metal cradle, there being first threaded openings adjacent each second opening. The common metal cradle has a slotted opening to accommodate a second supporting flexible strap attached to the back of the common metal cradle.

The common bottom bracket has a hinged segment attached at the bottom. The bottom of the common bottom bracket has a second threaded opening in it. The common bottom bracket has a metal slotted bracket to accommodate a flexible strap. The common metal cradle has a third opening through it. The third opening is essentially centered between the second openings and near a back edge of the common metal cradle.

There is a first telescoping bar and a second telescoping bar mounted parallel to each other that have near ends fixedly attached in openings in a front face of the hinged segment. Each telescoping bar has a compression clutch and a first coupling means attached near a center portion of the first telescoping bar and a second coupling means attached near a center portion of the telescoping bar.

The telescoping bars have a common base support coupler attached to them near a distal end and a common base support coupler attached to them near a near end.

There is a flexible strap having a first end and a second end. The flexible strap is joined at the first end to the first coupling means, the flexible strap second end being inserted through the first openings and then the second end is joined to the common top bracket through the first openings and then the second end is joined to the second coupling means.

There is a top wall mount and a bottom wall mount wherein the top wall mount comprises a first 90° angled plate having a first vertical segment and a first horizontal segment wherein there is a peg mounted on an under surface of the first horizontal segment, near a distal end.

The bottom wall mount comprises a second 90° angled plate having a second vertical segment and a second horizontal segment wherein there is a hub mounted on an upper surface of the second horizontal segment, near a distal end and a shaft inserted into the hub wherein the shaft is maintained in the hub by a clip.

In yet a further embodiment, there is a portable, foldable, transformable bicycle support rack as described Supra further comprising two tubular rods, each rod insertable in a side of the common base, each rod positionable such that an outer tip of each rod is being supported on the same plane surface as the common base couplers.

DETAILED DESCRIPTION OF THE INVENTION AND DRAWINGS

What is disclosed and described herein is a portable, foldable, transformable bicycle support rack 1 useful for bicycles. What is meant by "transformable" herein is that the device 1 can be wall mounted, floor mounted, tree or post mounted, or strap mounted. In all of the Figures where the bicycle tire appears, it is designated "61".

Figure 1:
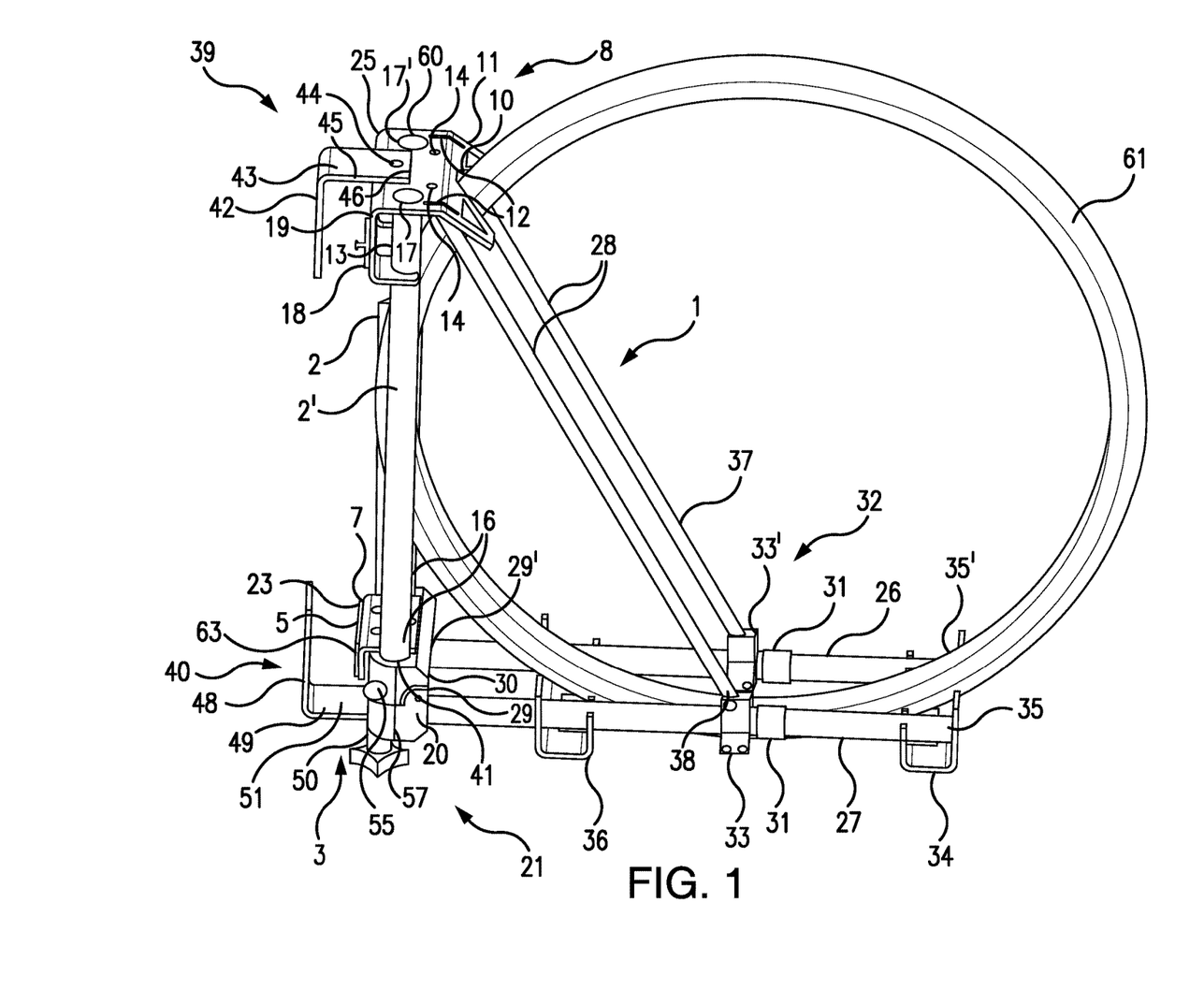
FIG. 1 is a view in perspective of a wall mountable device of this invention showing a tire of a bicycle.
Figure 2:
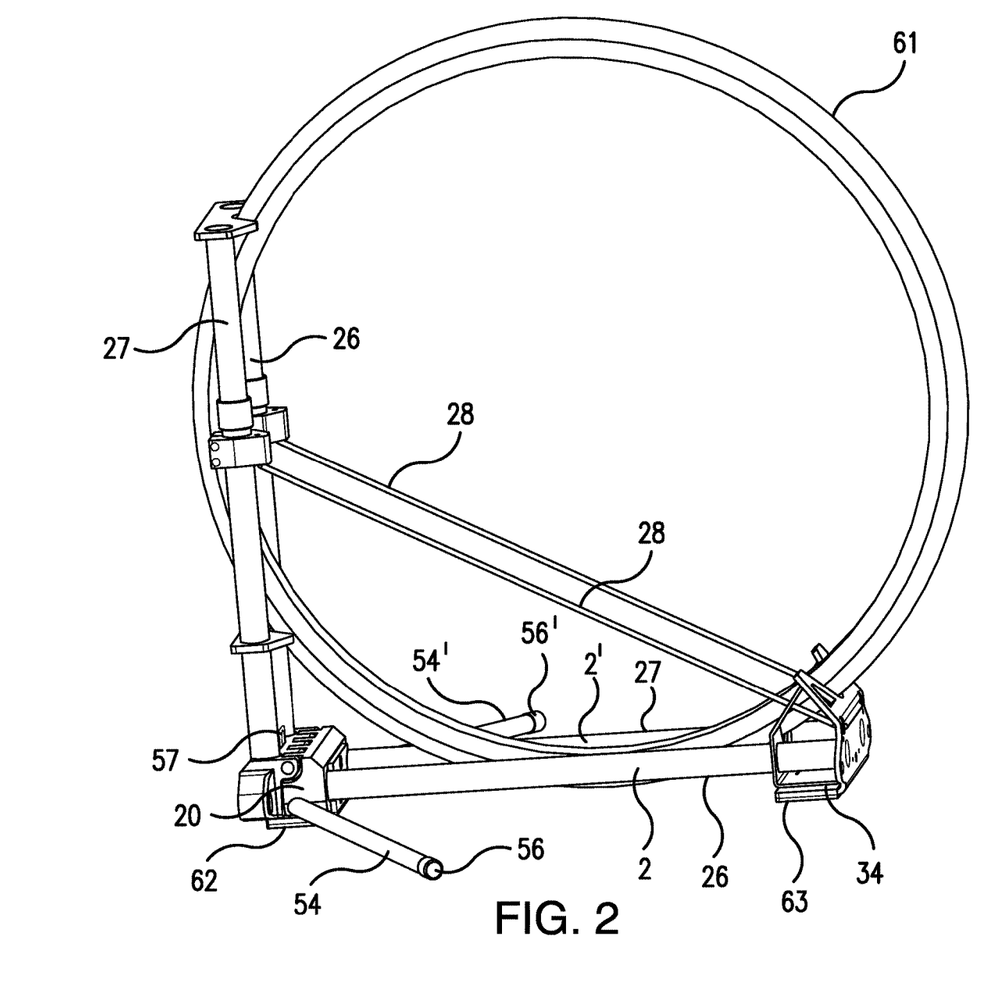
FIG. 2 is a view in perspective of a flat surface mountable device of is invention showing a tire of a bicycle.
Figure 3:
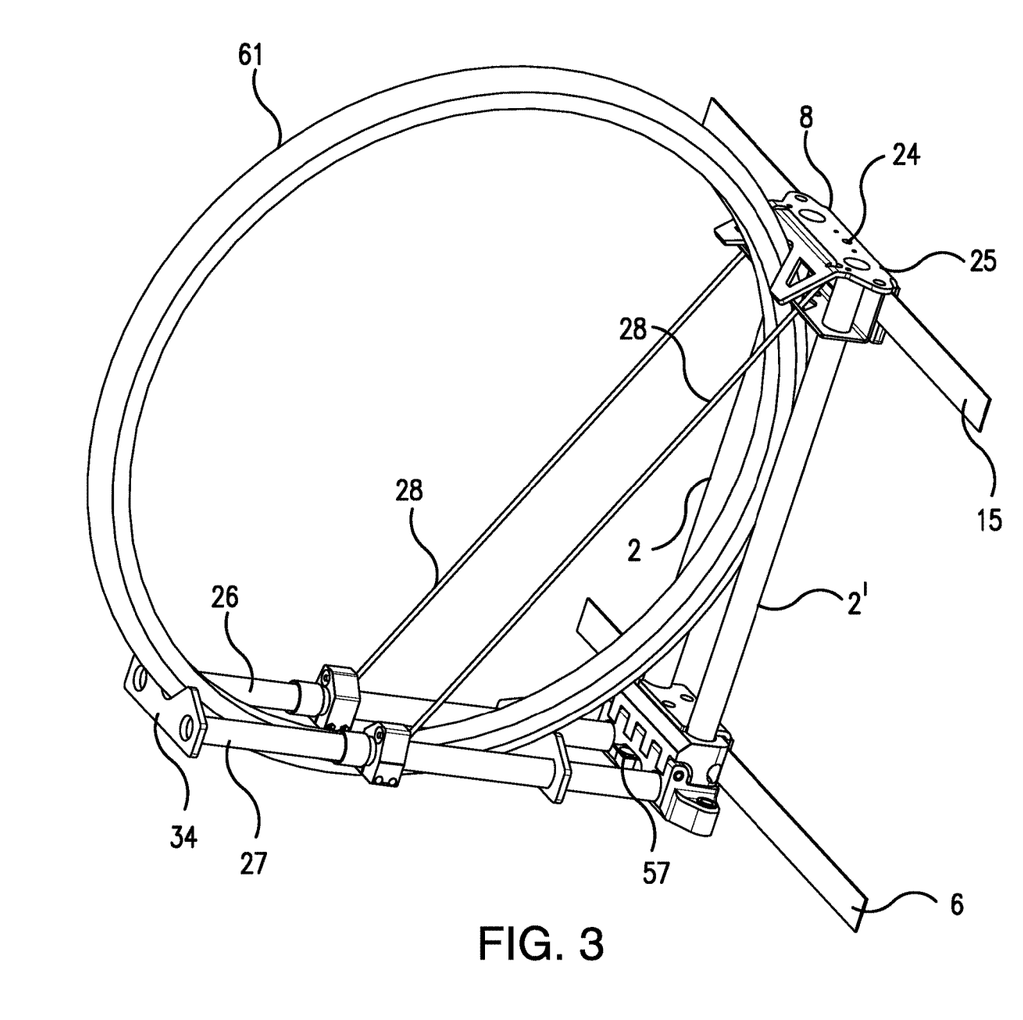
FIG. 3 is a view in perspective of a strap mountable device of this invention showing a tire of a bicycle.

The device 1, useful for a wall mounting, consists of two hollow, tubular support rods 2 and 2' that are fixed parallel to each other at a predetermined distance apart depending on what is desired to be supported by the device 1. The distal ends 16 and 16' are supported in a bottom common bracket 3 in openings 4 and 4'. The bottom common bracket 3 has a first slotted opening 5 to accommodate a first flexible supporting strap 6 that is located in the back 7 of the bottom common bracket 3. (see FIG. 3).

A near end 13 and 13' (opposite ends (of 16 and 16') of the rod from the distal end) of each support rod 2 and 2' is fixed to a top common metal cradle 8. The top common metal cradle 8 has a notch 10 in a forward edge 11. The top common metal cradle 8 also has separated first openings 12 formed in it. The near ends 13 and 13' of the support rods 2 and 2' extend through the second openings 17 and 17' in the top common metal cradle 8.

There are first threaded inserts adjacent each of the second openings 17 and 17' which can be used to mount the device 1 on a trailer or trailer tongue for transferability. The top common metal cradle 8 has a slotted opening 18 to accommodate a second supporting flexible strap 15 attached to the back 19 of the top common metal cradle 8 (see FIG. 3).

The common bottom bracket 3 has a hinged segment 20 attached at a bottom 21 of said common bottom bracket 3. The bottom 21 has a second threaded opening 22 in it in addition to a metal slotted bracket 23 to accommodate a flexible strap 6. The common metal cradle 8 has a third opening 24 in it (See FIGS. 4 and 5). This third opening 24 is essentially centered between the second openings 17 and 17' and near a back edge 25 of the common metal cradle 8.

There is a first telescoping bar 26 and a second telescoping bar 27 mounted parallel to each other at essentially the same distance as for the support rods 2 and 2', and having near ends 29 and 29', fixedly attached to a front face 30 of the hinged segment 20 in openings 65 and 65'. Each telescoping bar 26 and 27 has a compression clutch 31 mounted near a center portion 32 which gives each telescoping rod 26 and 27 a telescoping capability. In addition, each telescoping bar 26 and 27 has a first coupling means 33 and 33' attached near a center portion 32 of the telescoping bar 26 and 27.

The telescoping bars 26/27 have a common base support coupler 34 attached to them near a distal end 35 and 35' and a common base support coupler 36 attached near a near end 29 and 29'.

There is a flexible strap 28 having a first end 37 and a second end 38 that is joined at the first end 37 to the first coupling means 33. The flexible strap 28 second end 38 is inserted through the first opening 12 and then the second end 38 is joined to the common top bracket 8 through the first opening 12 and then the second end 38 is joined to the second coupling means 38.

There is a top wall mount 39 and a bottom wall mount 40. The top wall mount 39 comprises a first 90° angled plate having a first vertical segment 42 and a first horizontal segment 43 wherein there is a peg 44 mounted on an under surface 45 of the first horizontal segment 43 near a distal end 46.

The bottom wall mount 40 is comprised of a second 90° angled plate having a second vertical segment 48 and a second horizontal segment 49. There is a hub 50 mounted on an upper surface 51 of the second horizontal segment 49, near a distal end 52 and a shaft 53 inserted into the hub 50, the shaft being held in place by a clip.

As an auxiliary component there are two tubular rods 54 and 54'. Each rod 54 is insertable in a side opening 55 and 55' respectively, of the common bottom bracket 3. The rods 54 and 54' are positionable such that an outer tip 56 and 56' of each rod will be supported on the same plane surface as the common base couplers 34. In addition, there are pads 62 and 63 mounted on the back of the top common metal cradle and the bottom common bracket, respectively.

There is a spring clip 57 located in the common bottom bracket 3 for locking a supporting flexible strap 28 to the device 1. There is another spring clip 58 located in the common metal cradle 8 for locking the supporting flexible strap 28 to the device 1.

The openings 17 and 17' can be equipped with caps 60 to ensure that the rods 54 and 54' will remain in the support rods 2 and 2', respectively.

Figure 4:
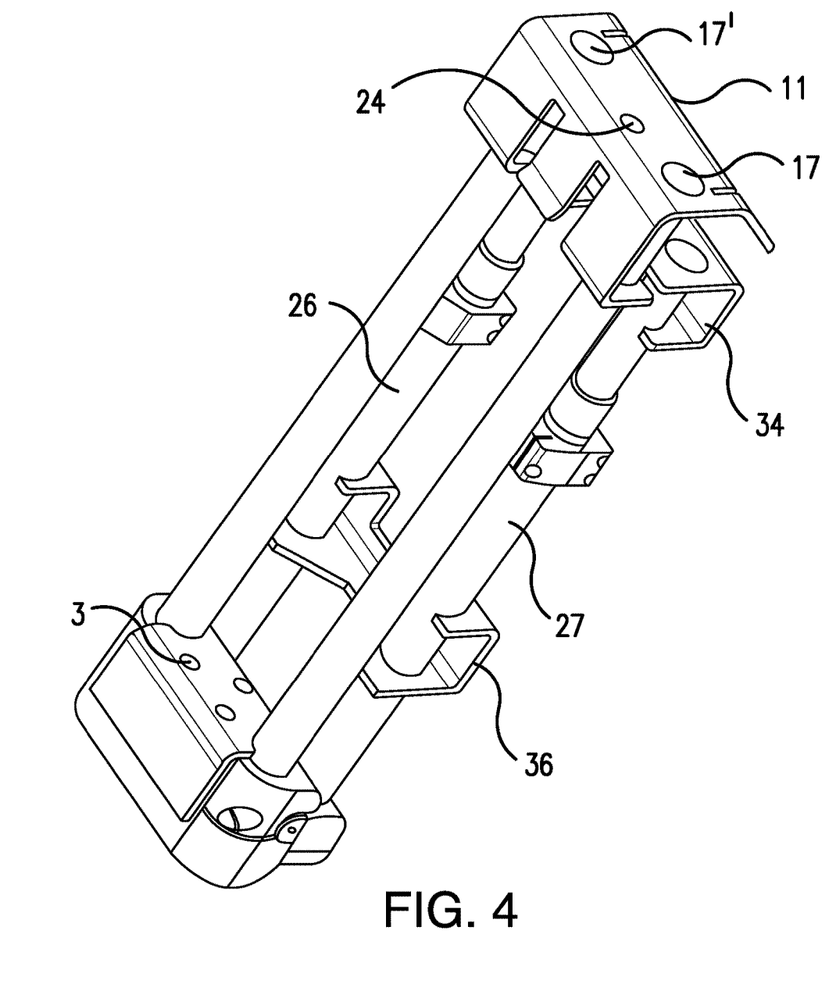
FIG. 4 is a back view in perspective of the device of this invention that has been transformed from an operative position to a storage or transferable position.
Figure 5:
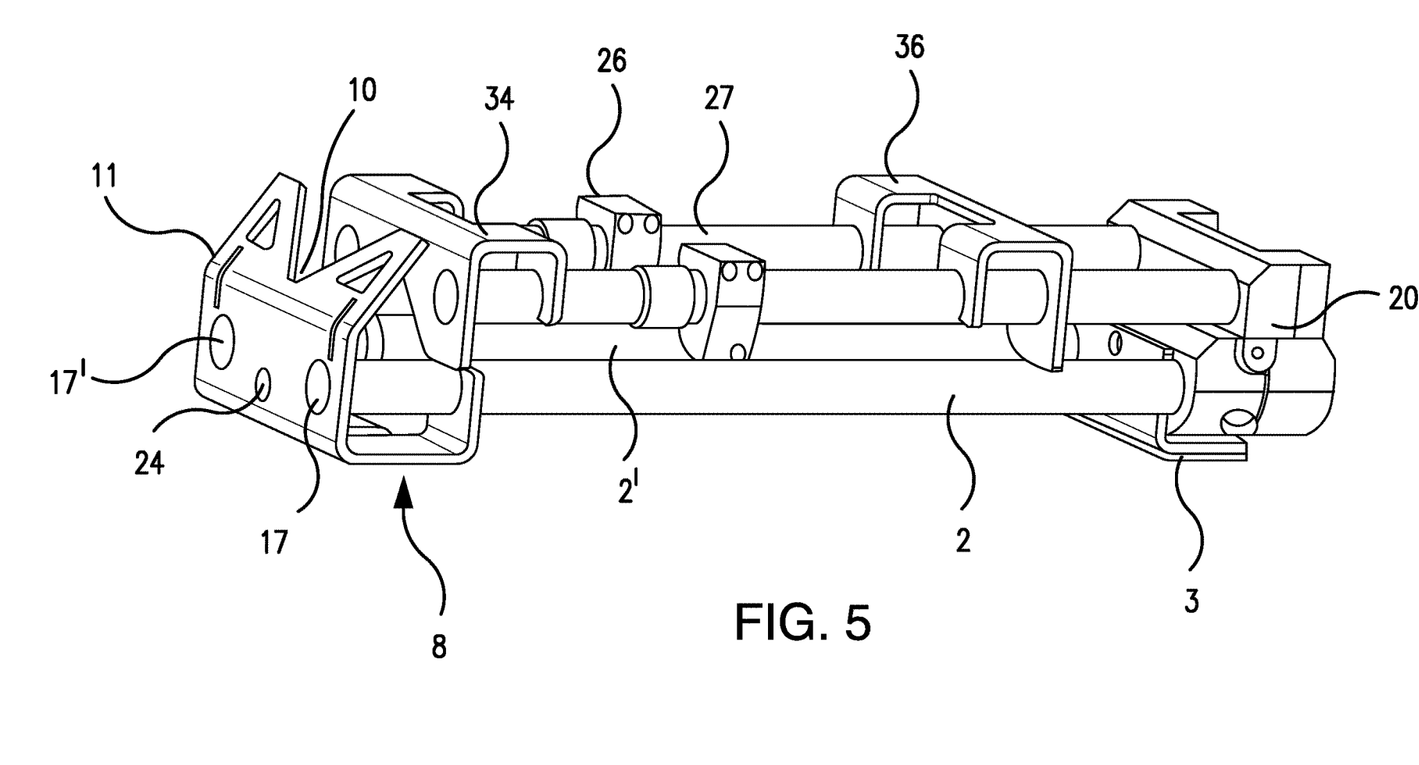
FIG. 5 is a side view in perspective of the device of this invention that has been transformed from an operative position to a storage or transferable position.
Figure 6A:
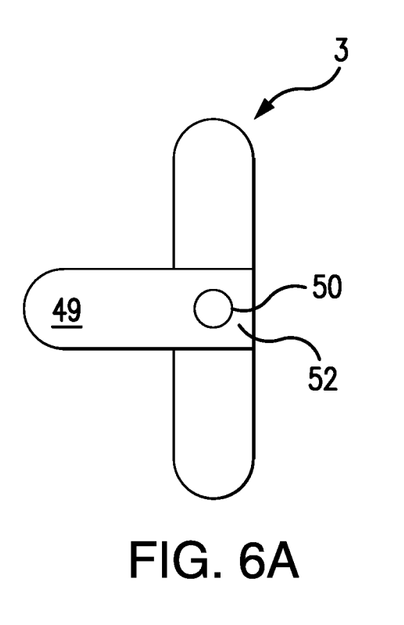
FIG. 6A is a partial bottom view of the bottom of a device of this invention showing the hub.
Figure 6B:
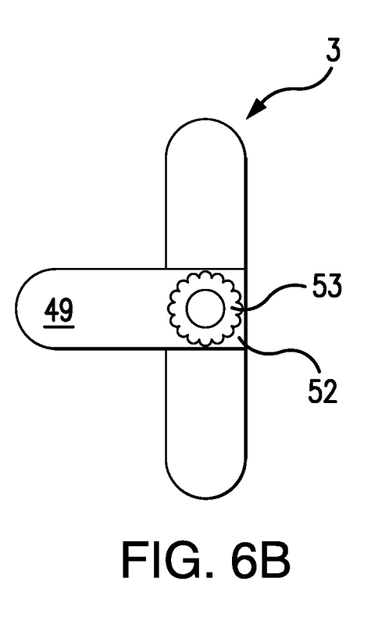
FIG. 6B is a partial bottom view of the bottom of a device of this invention showing the threaded shaft in place.
Figure 7:
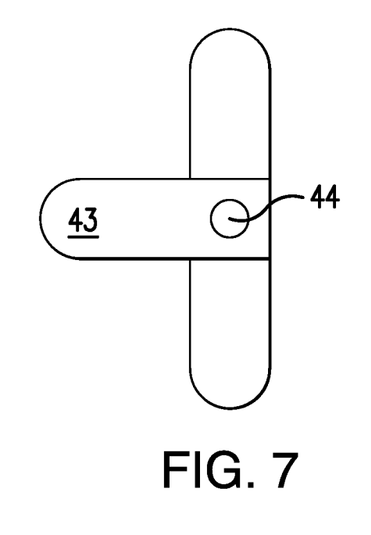
FIG. 7 is a partial top view of a device of this invention showing an opening and peg inserted in the opening.
Figure 8:
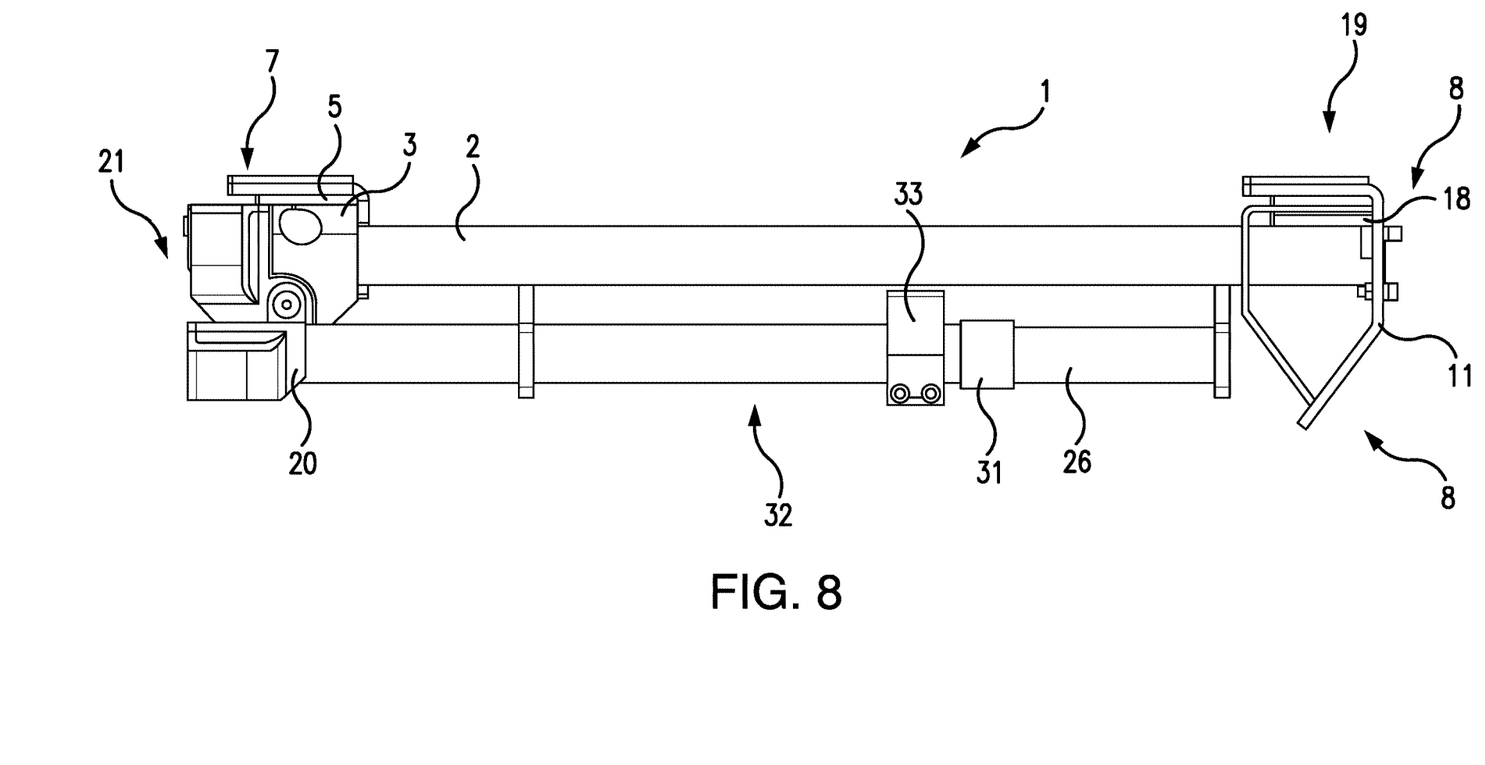
FIG. 8 is a full side view of a device of this invention.
Figure 9:
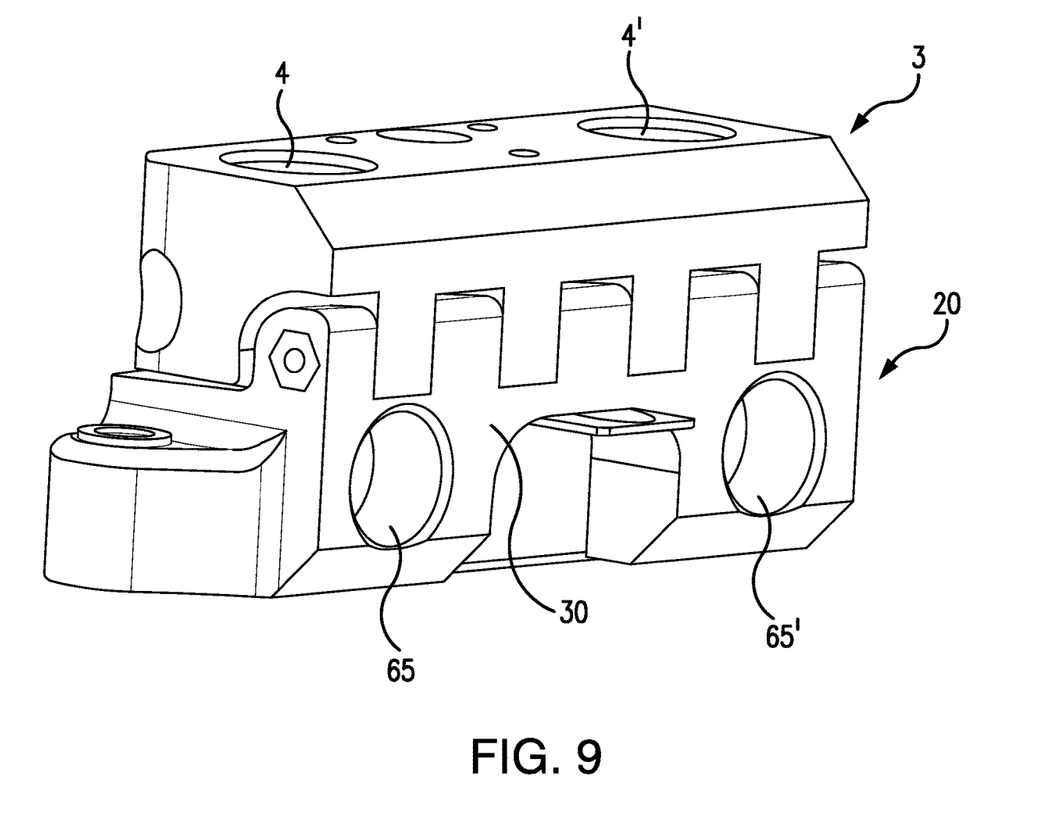
FIG. 9 is a view in perspective of the hinge of a device of this invention.

The devices of this invention can be a vertical wall mount or a floor (or other flat surface) rack. Vertical mounts means that the device 1 can not only be attached to a wall but can be attached to a strung strap, tree or pole or the like for storage when camping or on an outing. The device of this invention is portable, and FIGS. 4 and 5 show the device 1 in a folded configuration.

Because the device 1 has telescoping supports, the device is easily adjusted to accept common tire diameters and widths. This solves the problem of having to buy multiple bike racks for different diameter tires. After mounting, the device allows a swivel rotation so that a bicycle can be moved against a wall. The device 1 can easily disconnect from the wall with the turn of the rotatable threaded shaft and a lift from the top wall mount 39. The removable lateral support rods are stored inside of the support rods 2' and 2' and can be removed easily and slide into place in openings 55 and 55' and locking the device open and supporting the bike safely.

The device 1 also operates as a bike stand for supporting the bike in situations where there is no convenient attachability. For example, the device 1 can be mounted in a trailer for transportation. In events such as camping, bike races, snowbirds/travel events, the bicycles no longer have to be laid on the ground or leaned against objects that can easily damage them. The portability and compactness of the device 1 is made easy because of its structure and ability to fold into a compact arrangement.

The device 1 of this invention is stable owing to the unique locking hinge. The hinge is a finger jointed hinge and uniquely locks when support rods are inserted into the openings in the hinge.

What is claimed is:

1. A portable, transformable bicycle support rack, said portable transformable bicycle support rack consisting of:
   i) two hollow, tubular support rods, a bottom common bracket, and a first flexible supporting strap, wherein a distal end of each said support rod fixed parallel to each other in a distal end of each said support rod fixed parallel to each other in said bottom common bracket and at a predetermined distance apart, said bottom common bracket having a first slotted opening to accommodate said first flexible supporting strap to a back of said bottom common bracket;
   ii) a second supporting flexible strap; a top common metal cradle including a forward edge, said forward edge of said common metal cradle has a notch and separated first openings formed therein, said first end of each said support rod extending through respective second openings, first threaded openings adjacent each of said second openings, and a slotted opening; said near end of each said support rod being fixed to said top common metal cradle said near end of each said support rod extending through respective second openings in said common metal cradle, said common metal cradle having said slotted opening to accommodate a second supporting flexible strap attached to a back of said common metal cradle;
   iii) said common bottom bracket having a hinged segment attached at a bottom thereof, said bottom of said common bottom bracket having a second threaded opening therein; said common bottom bracket having a metal slotted bracket to accommodate said flexible strap; said common metal cradle having a third opening therethrough, said third opening being essentially centered between said second openings and near a back edge of said common metal cradle;
   iv) a first telescoping bar and a second telescoping bar mounted parallel to each other and having near ends fixedly attached in openings in a front face of said hinged segment, each said telescoping bar having a compression clutch and a first coupling means attached near a center portion of said first telescoping bar and a second coupling means attached near a center portion of said second telescoping bar;
   v) said telescoping bars having a common base support coupler attached thereto near a distal end and a common base support coupler attached thereto near a near end;
   vi) a flexible strap having a first end and a second end, said flexible strap being joined at said first end to said first coupling means, said flexible strap second end being inserted through said first openings and then said second end being joined to said common metal cradle through said first openings and then said second end being joined to said second coupling means;
   vii) a top wall mount and a bottom wall mount wherein said top wall mount comprises a first 90° angled plate having a first vertical segment and a first horizontal segment wherein there is a peg mounted on an under surface of said first horizontal segment, near a distal end;
   said bottom wall mount comprising a second 90° angled plate having a second vertical segment and a second horizontal segment wherein there is a hub mounted on an upper surface of said second horizontal segment, near a distal end, a shaft inserted into said hub, said shaft being maintained by a clip.

2. The portable, transformable bicycle support rack as claimed in claim 1 further comprising two tubular rods, each rod insertable in a side of said common base, each said rod positionable such that an outer tips of each said tubular rod will be supported on the same plane surface as said common base support couplers.

3. The portable, transformable bicycle support rack as claimed in claim 1 further comprising a spring clip located in said common bottom bracket for locking said supporting flexible strap to said portable, transformable bicycle support rack.

4. The portable, transformable bicycle support rack as claimed in claim 1 further comprising a spring clip located in said common metal cradle for locking said supporting flexible strap to said portable, transformable bicycle support rack.

5. The portable, transformable bicycle support rack as claimed in claim 1 further comprising caps for said first openings.

6. The portable, transformable bicycle support rack as claimed in claim 2 further comprising dimensional coordination of said first openings and said two insertable tubular rods such that the said two insertable tubular rods are insertable through said first openings and into said tubular support rods.

7. The portable, transformable bicycle support rack as claimed in claim 1 further comprising a fixed head for said rotatable threaded shaft.

8. The portable, transformable bicycle support rack as claimed in claim 1 that is manufactured from metal.

9. The portable, transformable bicycle support rack as claimed in claim 8 wherein said metal is aluminum.

10. The portable, transformable bicycle support rack as claimed in claim 9 wherein said aluminum is tubing.

11. The portable, transformable bicycle support rack as claimed in claim 9 wherein said aluminum is plating.

12. The portable, transformable bicycle support rack as claimed in claim 1 that is manufactured from plastic.

13. The portable, transformable bicycle support rack as claimed in claim 1 that is manufactured from a combination of metal and plastic components.

14. The portable, transformable bicycle support rack as claimed in claim 1 wherein said flexible straps are manufactured from Kevlar.

15. The portable, transformable bicycle support rack as claimed in claim 1 wherein said flexible straps are manufactured from Nylon.

* * * * *